US006551443B2

(12) United States Patent
Doh

(10) Patent No.: US 6,551,443 B2
(45) Date of Patent: Apr. 22, 2003

(54) APPARATUS FOR ETCHING GLASS SUBSTRATE IN FABRICATION OF LCD

(75) Inventor: Yong Il Doh, Taegu-Kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/026,474

(22) Filed: Dec. 27, 2001

(65) Prior Publication Data

US 2002/0084031 A1 Jul. 4, 2002

(30) Foreign Application Priority Data

Dec. 30, 2000 (KR) ........................................ 2000-86744

(51) Int. Cl.[7] .......................... H01L 21/306; B08B 3/04
(52) U.S. Cl. .............................. 156/345.11; 156/345.23
(58) Field of Search ........................ 156/345.11, 345.23

(56) References Cited

U.S. PATENT DOCUMENTS

| | | | |
|---|---|---|---|
| 3,964,957 A | * 6/1976 | Walshi | 118/500 |
| 5,071,488 A | * 12/1991 | Takayama et al. | 134/34 |
| 5,766,493 A | 6/1998 | Shin | 216/23 |
| 5,817,185 A | * 10/1998 | Shindo et al. | 134/15 |
| 5,835,176 A | 11/1998 | Jeong et al. | 349/124 |
| 5,839,456 A | * 11/1998 | Han | 134/104.1 |
| 5,911,837 A | * 6/1999 | Matthews | 134/2 |
| 5,914,281 A | * 6/1999 | Abe et al. | 156/345.11 |
| 6,197,209 B1 | 3/2001 | Shin et al. | 216/84 |
| 6,235,147 B1 | * 5/2001 | Lee et al. | 134/1.3 |

FOREIGN PATENT DOCUMENTS

| | | |
|---|---|---|
| JP | 2138459 | 5/1990 |
| JP | 3022390 | 1/1991 |
| JP | 4116619 | 4/1992 |
| JP | 5249422 | 9/1993 |
| JP | 5249423 | 9/1993 |
| JP | 7168172 | 7/1995 |

* cited by examiner

*Primary Examiner*—Gregory Mills
*Assistant Examiner*—Sylvia R. MacArthur
(74) *Attorney, Agent, or Firm*—McKenna Long & Aldridge LLP

(57) ABSTRACT

Disclosed is an improved apparatus for holding a bubble plate of an etching apparatus, in place with a cylinder, which is applicable to a glass substrate etching process, in order to facilitate changing and cleaning of the as bubble plate in a short period of time, as well as to prevent a low-quality etching and damage of the glass substrate caused by displacement of cassette guides in the etching apparatus. The etching apparatus according to the invention includes an etching bath having an etching solution, a plurality of cassette guides on a bottom surface of the etching bath, a cylinder on an external side of the etching bath, a plurality of plungers on the cylinder and the cassette guides, and a bubble plate fixed by the cassette guides.

16 Claims, 5 Drawing Sheets

1
2
3
410
400
4
6
5

APPARATUS FOR ETCHING GLASS SUBSTRATE IN FABRICATION OF LCD

This application claims the benefit of Korean Patent Application No. 2000-86744 filed on Dec. 30, 2000, which is hereby incorporated by reference as if fully set forth herein.

BACKGROUND OF THE INVENTION

1. Field of the Invention

The present invention relates to a device for etching a glass substrate during fabrication of a liquid crystal display (LCD) device, and in particular, to an apparatus for holding a bubble plate in place in an device.

2. Discussion of the Related Art

An LCD, a plasma display panel (PDP), an electroluminescent display (ELD) or a vacuum fluorescent display (VFD) are generally used for flat panel display devices. The LCD is one of the most commonly used and active research is being pursued heavily in this area.

Portable televisions and notebook computers employing the LCD are currently on sale. However, several problems still remain unsolved. In particular, reducing the size and weight is a critical task to be solved for portable televisions and notebook computers for the sake of portability.

A variety of methods may be applicable to reduction of weight of the LCD. However, it is difficult to reduce size and weight of other elements constituting the LCD in view of its structure and the current technology. Yet, the possibility still remains to reduce the weight of a glass substrate, which is a basic element of the LCD.

As the glass substrate is one of the largest weight elements among all the elements that make up a LCD, reducing the weight of the LCD can be preferably achieved by reducing the weight of the glass substrate. Here, reducing the weight of the glass substrate means reducing the thickness of the glass substrate.

However, reducing the thickness of the glass substrate leads to damage of the glass substrate. For example, uneven processing of a surface of the glass in the course of fabricating the glass substrate causes a critical fault in the quality of screen of the LCD. Therefore, it is a quite difficult and important task to reduce the thickness of the glass substrate evenly.

The most common method for reducing the thickness of the glass substrate thereby reducing the weight, is to etch the surface of the glass substrate by dipping the glass substrate into etchant confined in a container.

However, there are a number of problems with this method, for example, it fails to produce an evenly etched substrate due to imperfection of the substrate. Moreover, impure materials generated in the etching process stick to the substrate, thereby resulting in an uneven surface of the substrate.

Further, when etching the substrate to be very thin, a loading force on the substrate inherent in the processes of fabricating the LCD can cause a cracking in the substrate due to uneven thickness as a result of this etching method.

FIG. 1 is a block diagram illustrating a structure of a conventional device for etching a glass substrate. Referring to FIG. 1, the device comprises an etching section 8000 for etching the substrate, a cleaning section 6000 for removing the etching solution residual from the etched substrates with deionized water (DI), and a drying section 7000 for drying the cleaned substrate.

The etching section 8000 comprises an etcher 1000, an etching solution recycling section 2000 for storing the etching solution after removing impure materials generated by etching the substrate with the etcher 1000. Further, a DI supplying section 3000 for supplying DI, a undiluted etching solution supplying section 4000 for supplying a undiluted etching solution, and an etching solution mixing section 5000 for receiving the DI and the undiluted etching solution from the DI supplying section and the undiluted etching solution supplying section 4000, respectively, and receiving the purified etching solution from the etching solution recycling section 2000 to mix and supply the etching solution to the etcher 1000.

When performing an etching process by using the device for etching a glass substrate as constructed above, the etching solution inflows to an etching bath of the etcher 1000 from the etching solution mixing section 5000. If a glass substrate is put into the etching bath, the glass substrate is etched in the etching bath by a reaction between the glass substrate and the etching solution.

The etching solution is then circulated from the etcher 1000 to the etching solution recycling section 2000 and the etching solution mixing section 5000.

Meanwhile, in the process of etching the glass substrate to fabricate an LCD, a cassette receiving the glass substrate is put into the etching bath 1 filled with Hydrofluoric (HF) acid used to etch the glass substrate. The following is a detailed description of that process.

As shown in FIGS. 2 and 3, the conventional device for etching a glass substrate comprises an etching bath 1 filled with HF, an etching solution, a cassette installed within the etching bath 1 for receiving a glass substrate, a plurality of cassette guides 3 installed on a lower portion of the cassette 2, a plurality of bolts 7 of a Teflon material penetrating the cassette guides 3 and is clamped with the etching bath 1, and a bubble plate 4 fixed onto the cassette guides 3 and having a plurality of bubble holes 400 for forming bubbles.

A plurality of carrier gas supplying holes 410 are formed on side surfaces of the bubble plate 4 so as to be connected to a nitrogen supplying line (not shown in the drawings).

Two bolts 7 are clamped with each of the cassette guides 3. Thus, a total of eight bolts 7 are clamped with the cassette guides 3.

This conventional device for etching a glass substrate has a drawback of changing and cleaning the bubble plate 4 when the bubble plate 4 is blocked by sludge generated during the etching process. When this occurs the bubble plate 4 is changed and cleaned after releasing all of the bolts 7 of a Teflon material and detaching the cassette guides 3. After the cleaning, the bubble plate 4 is reassembled in a reverse order. This drawback causes a significant delay resulting in higher production costs.

In addition, the conventional device for etching the glass substrate often fails to etch the glass substrate in a high quality manner and is likely to damage the glass substrate. For example, as a result of changing the bubble plate, the bolts 7 supporting the cassette guides 3 can be displaced from their original positions within the etching bath 1.

Further, when changing the bubble plate 4, sludge often flows into the clamping holes of the bolts 7, thereby causing an incomplete clamping. Such a displacement of the cassette guides 3 within the etching bath 1 results in a low-quality etching and a damage of the glass substrate.

In addition, the process of releasing two bolts 7 from each of the cassette guides 3 consumes a long period of time, and subsequently poses a jeopardy to a worker of being exposed to harmful HF for a longer period of time.

SUMMARY OF THE INVENTION

Accordingly, the present invention is directed to an apparatus that substantially obviates one or more of the problems due to the limitations and disadvantages of the related art. It is, therefore, an object of the present invention to provide an apparatus for etching a glass substrate which can prevent low-quality etching and damage of the glass substrate. Ideally an apparatus prevents damage caused by the displacement of the cassette guides, for example, by improving a method of fixing the bubble plate within an etching bath by providing a cylinder so as to facilitate the changing and cleaning process.

To achieve the above object, there is provided an apparatus for etching a glass substrate in fabrication of an LCD, comprising: an etching bath having an etching solution; a plurality of cassette guides on a bottom surface of the etching bath; a cylinder on an external side of the etching bath; a plurality of plungers on the cylinder and the cassette guides; and a bubble plate fixed by the cassette guides.

The apparatus for etching a glass substrate according to the present invention has an advantage of shortening the period of time for changing and cleaning the bubble plate and preventing a low-quality etching and damage of the glass substrate caused by displacement of the cassette guides.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The above and other objects, features and advantages of the present invention will become more apparent from the following detailed description when taken in conjunction with the accompanying drawings.

In the drawings.

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 4A:
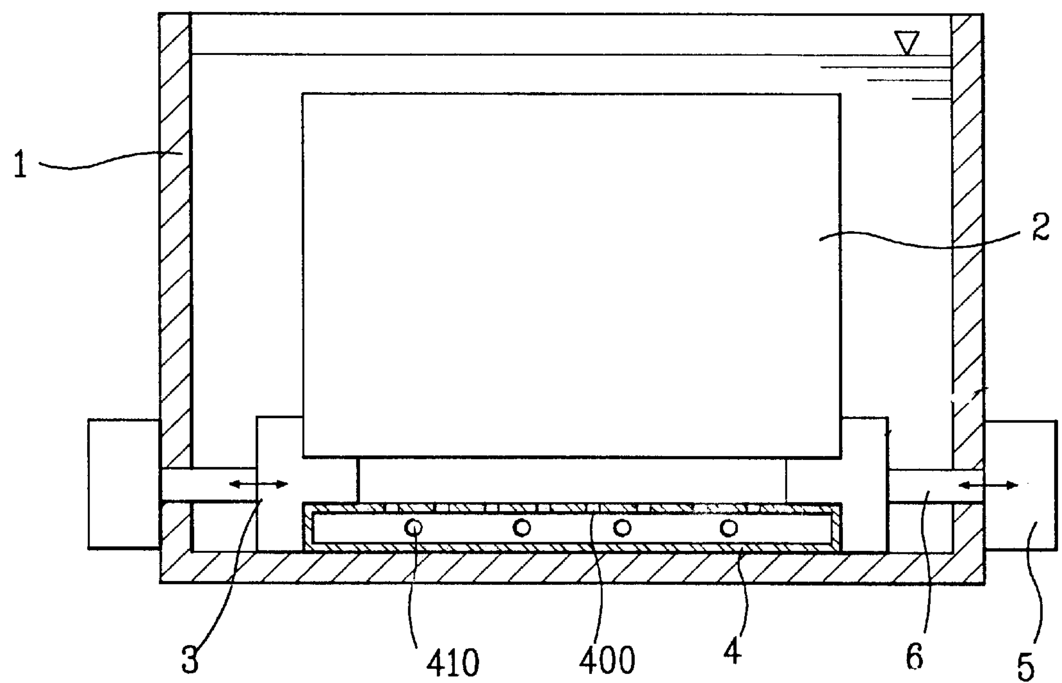
FIG. 4A is a longitudinal section view illustrating a gripped state of a bubble plate of a apparatus for etching a glass substrate according to an embodiment of the present invention.
Figure 4B:
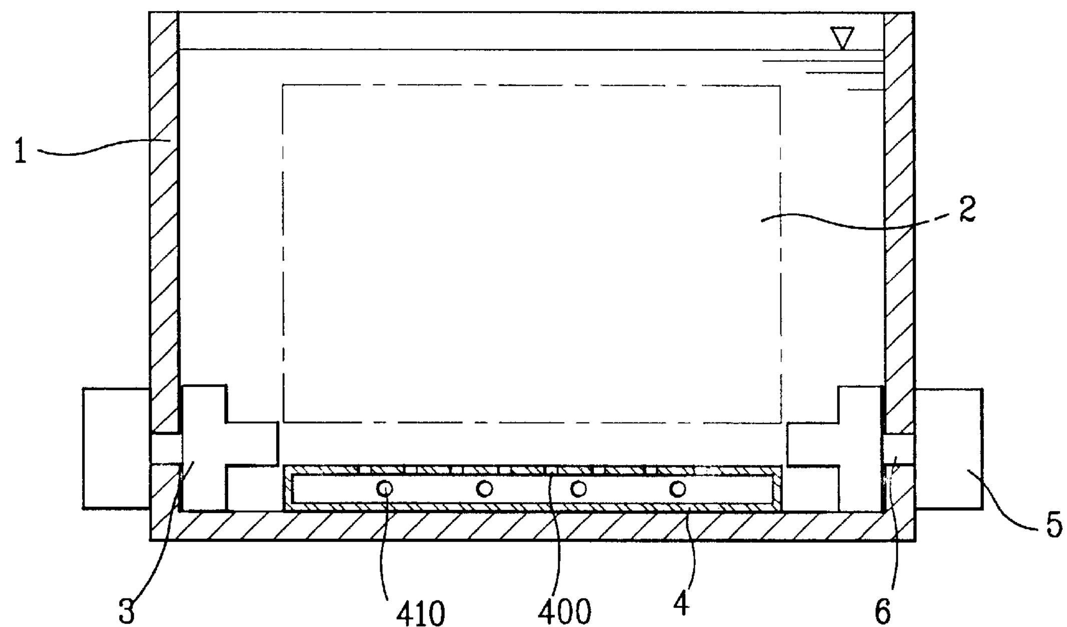
FIG. 4B is a longitudinal section view illustrating a released state of the bubble plate of a apparatus for etching a glass substrate according to an embodiment of the present invention.

FIGS. 4A and 4B are longitudinal section views illustrating an apparatus for etching a glass substrate according to an embodiment of the present invention. The apparatus for etching a 13 glass substrate comprises an etching bath 1 containing an etching solution, cassette guides 3 installed on a bottom surface of the etching bath 1 for loading a cassette 2 for receiving glass substrates, a cylinder 5 installed at an external side of the etching bath 1, plungers 6 mounted on the cylinder 5 and clamped with the cassette guides 3 for moving the cassette guides 3 forward and backward when the cylinder 5 is in operation, and a bubble plate 4 fixed by the cassette guides 3 and having a plurality of bubble holes 400 for forming bubbles.

Here, for example, the cylinder 5 is an air cylinder, and the plungers 6 housed within the cylinder 5 are made of a Teflon material. The cylinder 5, however, may be made of any corrosion resistant material or hybrid.

At least one or more tubes (not shown in the drawings) are connected to carrier gas supplying holes 410 for supplying carrier gas, for example, nitrogen, oxygen, argon, and the like and are connected to the etching bath 1.

The following is a description of an operation of the present invention constructed as above.

As the plungers 6 are moved forward in the etching process, the four corners of the bubble plate 4 are gripped by the cassette guides 3 to prevent movement of the bubble plate 4, as shown in FIG. 4A.

If nitrogen is supplied through the carrier gas supply holes 410 of the bubble plate 4 nitrogen forms numerous bubbles while passing through the bubble holes 400 located on an upper surface of the bubble plate 4. As a consequence, each glass substrate housed within the cassette 2 uniformly etching.

If the bubble plate 4 becomes blocked by the sludge generated as a result of etching processes, then the bubble plate 4 should be changed or cleaned before proceeding with additional etching.

To change or clean the bubble plate, the plungers 6 move backward by an operation of the cylinder 5 when substrates have been removed from the cassette 2, as shown in FIG. 4B. Subsequently, the cassette guides 3 engaged with the plungers 6 also move backward to remove interference between the cassette guides 3 and the bubble plate 4.

As a result, the worker can easily detach the bubble plate 4 from the etching bath to be changed or cleaned.

When changing or cleaning the bubble plate 4 as described above, the bubble plate 4 can be easily attached to the etching bath due to the backward and forward movement of the cassette guides 3, which engage the plungers 6 of a Teflon material or by an operation of the cylinder 5, unlike the conventional technology. The plungers 6 may be made of any suitable material that would be resistant to corrosion that one of ordinary skill in the art would typically use.

The cassette guides 3 according to the present invention are not clamped with bolts, and thus are not liable to be displaced within the etching bath 1 due to the sludge and bubbles. Therefore, the problems of low-quality etching or damage of the glass substrate can be resolved.

When proceeding with etching by the apparatus for etching a glass substrate as described above, the etched degree can be learned by measuring temperature of the heat of reaction between the HF solution and the glass substrate. Therefore, a glass substrate etched at an even thickness can be obtained by ceasing the etching when the exothermic reaction between the HF solution and the glass substrate reaches a predetermined temperature upon measuring variation of the temperature. For example, the variation of the temperature can be monitored by a temperature measuring device (not shown in the drawings) attached inside of the etching bath 1.

Figure 1:
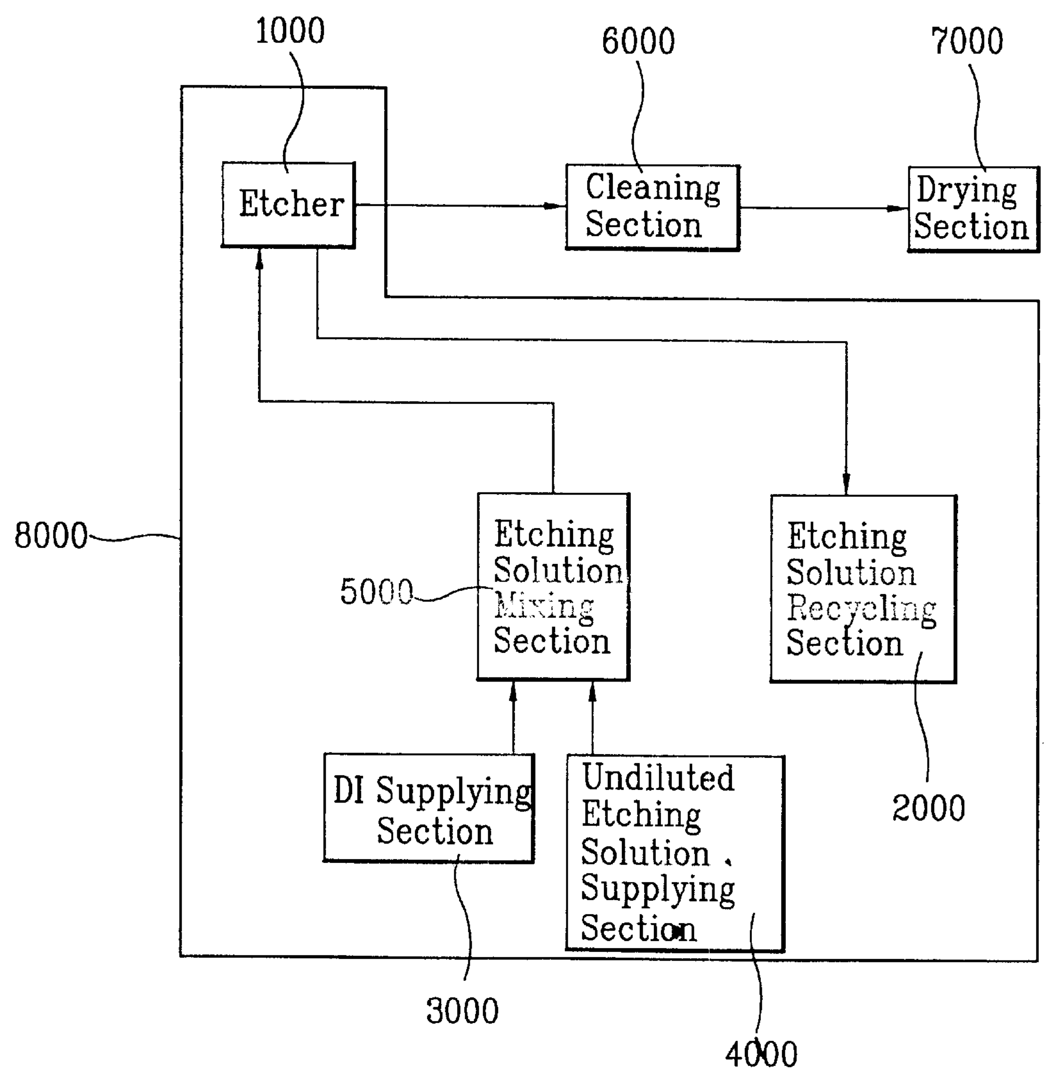
FIG. 1 is a block diagram illustrating a construction of a conventional apparatus for etching a glass substrate.
Figure 2:
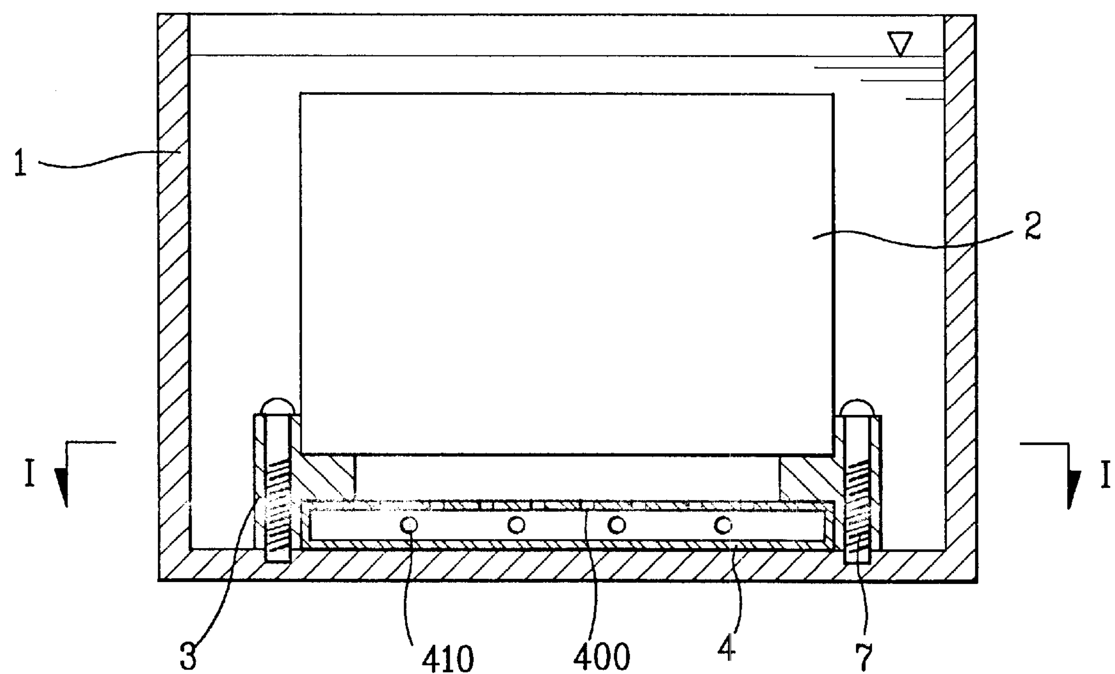
FIG. 2 is a longitudinal section view of a conventional apparatus for etching a glass substrate.
Figure 3:
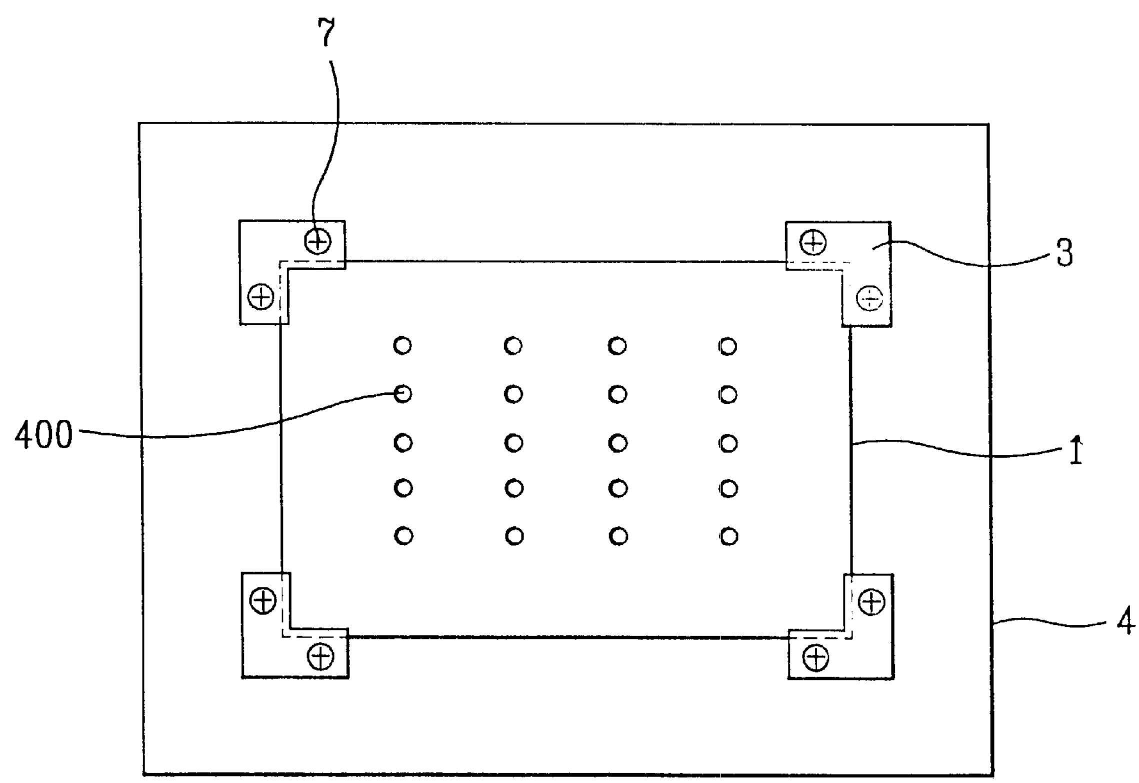
FIG. 3 is a cross-sectional view of line I—I in FIG. 2.

Meanwhile, the fully etched glass substrate is moved to a cleaning section 6000 (refer to FIG. 1) to remove the HF solution or residue stuck onto the surface of the substrate and is dried by a drying section 7000 (refer to FIG. 1).

The substrate can comprise two substrates: a first substrate, and a second substrate. An LCD is fabricated by injection a liquid crystal layer between the first substrate and the second substrate upon completion of the etching. The etching process may be proceeded with after bonding the two substrates in connection with injection of a liquid crystal layer.

The present invention an improved apparatus for fixing a bubble plate in an etching bath, which uses a cylinder and plunger to hold the bubble pate in place. Therefore, the present invention provides advantages of facilitating change and cleaning of the bubble plate in a short period of time as well as of preventing a low-quality etching and damage of the glass substrate caused by displacement of the cassette guides in the etching apparatus.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for etching a glass substrate, comprising:

an etching bath;

a plurality of cassette guides on a bottom surface of the etching bath;

a cylinder on an external side of the etching bath;

a plurality of plungers on the cylinder and the cassette guides; and a bubble plate held by the cassette guides.

2. The apparatus of claim 1, wherein the cylinder includes an air cylinder.

3. The apparatus of claim 1, wherein the plungers are formed of corrosion resistant material.

4. The apparatus of claim 1, wherein the plungers are formed of Teflon material.

5. The apparatus of claim 1, wherein an upper surface of the bubble plate includes a plurality of bubble holes.

6. The apparatus of claim 1, further comprising a plurality of carrier gas supplying holes on the bubble plate.

7. The apparatus of claim 6, wherein the carrier gas includes nitrogen.

8. The apparatus of claim 6, wherein the carrier gas includes oxygen.

9. The apparatus of claim 1, wherein the cassette guides are used to fix the bubble plate and support the cassette.

10. The apparatus of claim 1, wherein the plungers move the cassette guides backward and forward.

11. The apparatus of claim 1, wherein the plungers are fixed to the cassette guides.

12. The apparatus of claim 1, wherein the etching solution includes HF solution.

13. The apparatus of claim 1, further comprising a cleaning section for removing the etching solution.

14. The apparatus of claim 1, further comprising a drying section for drying the glass substrate.

15. The apparatus of claim 1, further comprising a recycling section.

16. An apparatus for etching a glass substrate, comprising:

an etching bath;

a plurality of cassette guides on a bottom surface of the etching bath;

a cylinder on an external side of the etching bath;

a plurality of plungers on the cylinder and the cassette guides; and a bubble plate held by the plunger.

* * * * *